United States Patent
Grumberg et al.

(10) Patent No.: US 6,510,677 B1
(45) Date of Patent: Jan. 28, 2003

(54) ADJUSTABLE MOWING AND TRIMMING APPARATUS

(75) Inventors: Mathieu J. Grumberg, Delmar, NY (US); Charles R. Elder, Averill Park, NY (US)

(73) Assignee: MTD Products Inc, Cleveland, OH (US)

(*) Notice: Subject to any disclaimer, the term of this patent is extended or adjusted under 35 U.S.C. 154(b) by 0 days.

(21) Appl. No.: 09/715,243

(22) Filed: Nov. 17, 2000

Related U.S. Application Data

(60) Provisional application No. 60/167,341, filed on Nov. 24, 1999.

(51) Int. Cl.$^7$ .............................................. A01D 34/00
(52) U.S. Cl. ............................................. 56/12.7; 56/15.4
(58) Field of Search .................... 280/98, 103, 93.502; 56/12.1, 12.7, 13.4, 16.7, 17.5, 16.9, 15.4, 14.7

(56) References Cited

U.S. PATENT DOCUMENTS

| | | | |
|---|---|---|---|
| 2,669,826 A | 2/1954 | Watrous | 56/13.4 |
| 4,077,191 A | 3/1978 | Pittinger, Sr. et al. | 56/12.7 |
| 4,703,613 A * | 11/1987 | Raymound | 56/12.7 |
| 4,873,819 A | 10/1989 | Shrivers et al. | |
| 4,977,733 A * | 12/1990 | Samejima et al. | 56/14.7 |
| 5,020,308 A * | 6/1991 | Braun et al. | 56/11.3 |
| 5,174,595 A * | 12/1992 | Snipes | 280/91 |
| 5,667,032 A * | 9/1997 | Kamlukin | 180/256 |
| 5,862,655 A | 1/1999 | Altamirano et al. | 56/12.1 |

FOREIGN PATENT DOCUMENTS

| WO | WO 91/01240 | * 2/1991 | B62D/9/00 |
|---|---|---|---|

OTHER PUBLICATIONS

Troy–Bilt Parts Catalog—Trimmer/Mower, Models: 52027; 52028; 52029; 52036; 52048, Mar. 1999, pp. 1–12.

* cited by examiner

Primary Examiner—Thomas B. Will
Assistant Examiner—Árpád Fábián Kovács
(74) Attorney, Agent, or Firm—Brouse McDowell; Roger D. Emerson; Timothy D. Bennett

(57) ABSTRACT

An adjustable mowing and trimming apparatus is presented having a wheel adjust mechanism and trimming assembly. The apparatus includes a housing to which at least two wheels are rotatably mounted at opposite sides of the wheel adjust mechanism. The wheel adjust mechanism includes a pair of wheel brackets having a C-shaped configuration, each of which pivotally attaches to the housing and is provided with an outwardly extending axle for supporting a wheel. A tie rod attaches at respective opposite ends to the wheel brackets. A slotted bracket is attached to the tie rod and movable in response to a movable arm to reorient the wheels on either side of the housing. The trimming assembly is mounted at a front portion of the housing and includes a spindle assembly rotatably attached to a shaft, which is fixedly attached to the housing.

12 Claims, 7 Drawing Sheets

ADJUSTABLE MOWING AND TRIMMING APPARATUS

RELATED APPLICATION

This application claims the benefit of U.S. Provisional Application No. 60/167,341, filed Nov. 24, 1999, entitled "Adjustable Mowing and Trimming Apparatus," the contents of which are hereby incorporated in its entirety by reference.

TECHNICAL FIELD

The invention relates generally to vegetation trimmers, and more particularly, to a combined mowing and trimming apparatus of a type that is mounted on a frame and supported on two wheels.

BACKGROUND ART

A variety of different types of mowing and trimming devices have been devised for meeting the requirements of particular applications. Conventional lawn maintenance, however, has required a lawn mower to cut the lawn and a lawn trimmer to trim the edges of the lawn, including areas of vegetation that border fences, buildings, etc. Flexible line vegetation trimmers are commonly used today for such trimming operations. Although the equipment for this two-part procedure is readily available, the procedure inherently involves a substantial duplication of effort since an operator must guide both types of equipment over substantially the same area, e.g., adjacent to buildings and other structures.

In response, various devices that combine mowing and trimming features in one machine have been developed. For example, such a mowing and trimming apparatus is disclosed by Altamirano et al. in U.S. Pat. No. 5,862,655 assigned to the assignee of the present invention. The apparatus disclosed in Altamirano et al. includes a frame having front, rear and opposite side portions. A handle is secured to the frame at the rear portion and a trimming assembly is mounted to the front portion. A wheel adjust mechanism is provided at the rear portion of the frame which attaches to a pair of ground engaging wheels.

The trimming assembly includes a spindle head and a trimmer head. The spindle head is fixedly mounted onto a shaft so as to rotate with the shaft which is driven by the mowing and trimming apparatus. The trimmer head is adjustably clamped about the spindle head so as to rotate therewith.

By simple actuation of a wheel adjust mechanism, the wheels are effectively steered between a left position, center position, or right position, thus effectively placing the trimming assembly to either side of the wheels thereby permitting conveniently trimming along buildings, under fences, around trees, etc.

There remains further room in the art for improvements to a mowing and trimming apparatus, and in particular to the trimming assembly and the wheel adjust mechanism.

SUMMARY OF THE INVENTION

Briefly summarized, the present invention provides in one aspect, a spindle assembly for use in a trimming assembly of a mowing and trimming apparatus in which the spindle assembly includes a shaft fixedly and non-rotatably attachable to the mowing and trimming apparatus, and a spindle unit attachable to the shaft and driveable by the mowing and trimming apparatus for rotation about the shaft.

In another aspect, a spindle assembly for use in a trimming assembly of a mowing and trimming apparatus includes a shaft fixedly and non-rotatably attachable to the mowing and trimming apparatus, and a spindle unit comprising means for supporting the spindle unit for rotation about the shaft and means, driveable by the mowing and trimming apparatus, for rotating the spindle unit about the shaft.

In another aspect, a method for rotatably supporting a trimmer head of a mowing and trimming apparatus includes fixedly and non-rotatably attaching a shaft to the mowing and trimming apparatus, supporting a spindle unit, driveable by the mowing and trimming apparatus, for rotation about the fixedly and non-rotatably attached shaft, and attaching the trimmer head to the spindle unit.

In another aspect, a trimming assembly for use in a mowing and trimming apparatus includes, a spindle assembly as described above, and a trimmer head adjustably clampable about the spindle assembly so as to rotate therewith.

In another aspect, a wheel adjust mechanism is provided for a mowing and trimming apparatus having a housing with front, rear, and opposite side portions, and a pair of ground engaging wheels. The wheel adjust mechanism includes a pair of pivotal brackets each having a first end portion and a second end portion. Each of the first end portions of the brackets is pivotally attachable to a different one of the opposite side portions of the housing. Each pair of axles is attachable to a different one of the pair of brackets and outwardly-extending therefrom for rotatably attaching to the ground engaging wheels. A tie rod having a first end and a second end attaches at each end to a different one of the second end portions of the brackets, and means for adjustably moving the tie rod relative to the housing is provided to cause the ground engaging wheels attached to the brackets to pivot relative to the housing of the mowing and trimming apparatus.

In another aspect, a mowing and trimming apparatus includes a housing having front, rear and opposite side portions, a handle connectable to the rear portion of the housing, a trimming assembly as described above mountable to the housing at the front portion, means for rotating the trimming assembly about an axis of rotation, and a pair of ground engaging wheels rotatably attached to the rear portion of the housing.

In still another aspect, a mowing and trimming apparatus includes a housing having front, rear and opposite side portions, a handle connectable to the rear portion of the housing, a trimming assembly mountable to the housing at the front portion, means for rotating the trimming assembly about an axis of rotation, a pair of ground engaging wheels, and a wheel adjust mechanism as described above attached to the housing and to the ground engaging wheels for adjusting the position of the wheels relative to the housing.

BRIEF DESCRIPTION OF DRAWINGS

The subject matter which is regarded as the present invention is particularly pointed out and distinctly claimed in the concluding portion of the specification. The invention, however, both as to organization and methods of practice, together with further objects and advantages thereof, may best be understood by reference to the following detailed description taken in conjunction with the accompanying drawings in which:

DETAILED DESCRIPTION OF THE INVENTION

Figure 1:
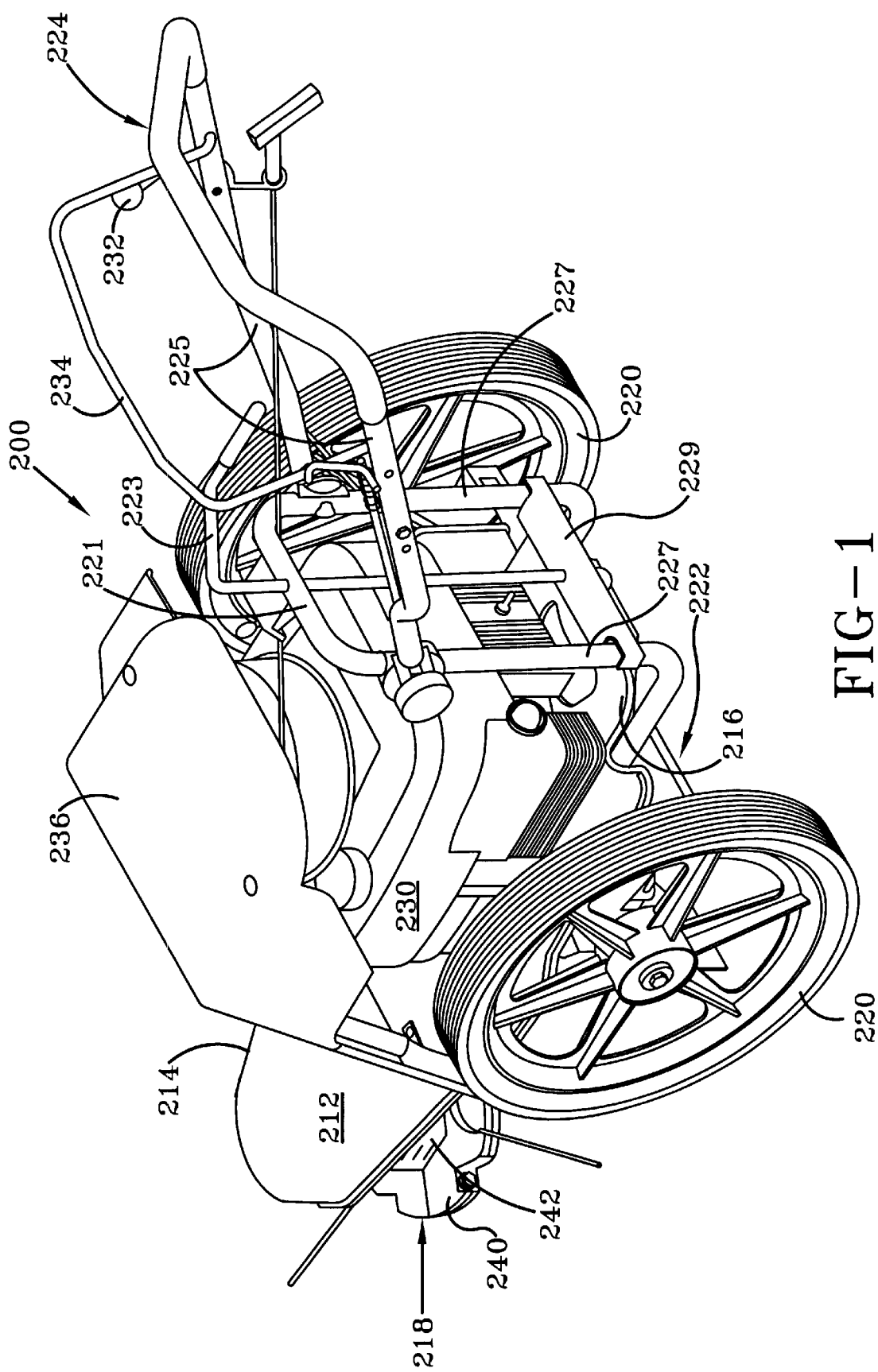
FIG. 1 is a rear perspective view of a mowing and trimming assembly of the present invention.

FIG. 1 depicts one embodiment of an adjustable mowing and trimming apparatus, generally denoted 200, in accordance with the present invention. Apparatus 200 includes a casting or housing 212 having a front portion 214, a rear portion 216, and opposite side portions. As one example, housing 212 comprises a lightweight and rigid aluminum structure sized for mounting all of the components of apparatus 200. The shape is designed so that a trimming assembly 218 is exposed at front portion 214 to facilitate unobstructed cutting of vegetation. In the example depicted, trimming assembly 218 comprises a line type trimmer, however, many of the novel concepts presented herein are applicable to blade type trimming assemblies as well.

Apparatus 200 comprises a two-wheeled structure having a pair of ground engaging wheels 220 disposed on opposite sides of housing 212 at rear portion 216 thereof, but near the balance point of the apparatus. This is to minimize the weight supported by trimming assembly 218. Wheels 220 are relatively large for easy rolling and excellent maneuverability, even over rough terrain.

A wheel adjust mechanism 222 (best shown in FIGS. 7 and 8) allows for significant, convenient pivoting of wheels 220 to change their orientation either to the left or to the right of housing 212, while still maintaining the wheels parallel. More particularly, wheel adjust mechanism 222 is actuated by an operator, to steer and lock wheels 220 in a front-facing (centered) position, left oriented position, or right oriented position.

As can be envisioned by one of ordinary skill in the art, positioning of wheels 220 in either a left orientation or a right orientation relative to housing 212 results in trimming assembly 218 being placed to the right or left, respectively, of the parallel oriented wheels 220. In accordance with the present invention, wheel adjust mechanism 222 allows trimming assembly 218 to be more easily and completely exposed in the right or left position relative to the parallel oriented wheels 220 to provide improved trimming around buildings, fences, etc.

Connected to rear portion 216 of housing 212 is a handle assembly 224 having an upper portion 225 and a lower portion 227 pivotally coupled together so that upper handle 225 can collapse to facilitate storage or transport of apparatus 200. Handle assembly 224 is fixedly secured to housing 212 and does not pivot with wheels 220. Upper handle portion 225 provides structure for an operator to propel apparatus 200 and provides a mounting surface for a throttle 232 and an automatic shutoff 234.

A conventional gasoline powered engine 230 is mounted to an upper surface of housing 212. However, those skilled in the art should note that the concepts presented herein are equally applicable to an electric powered trimming apparatus.

The crankshaft of engine 230 protrudes downward through a hole in housing 212 to an underside of the housing where a pulley (not shown) attached to the crankshaft provides power to trimming assembly 218 via a belt 380 (FIG. 4) and related components disposed on the underside of the housing. These components, which provide clutching/declutching and power transfer from the engine to the trimming assembly, are conventional. One skilled in the art is directed to any one of a number of commercially available cutting and trimming apparatus for further information on such components. The system preferably incorporates a braking feature tied to shutoff 234 to ensure that the trimming assembly does not rotate when shutoff 234 is disengaged from an operate position.

In the embodiment shown, a debris shield 236 partially shields engine 230, wheels 220, and an operator from any debris which may be thrown by the rotating trimming assembly 218. Debris shield 236 also prevents tall cuttings from falling and becoming entangled in the engine or wheels.

Figure 2:
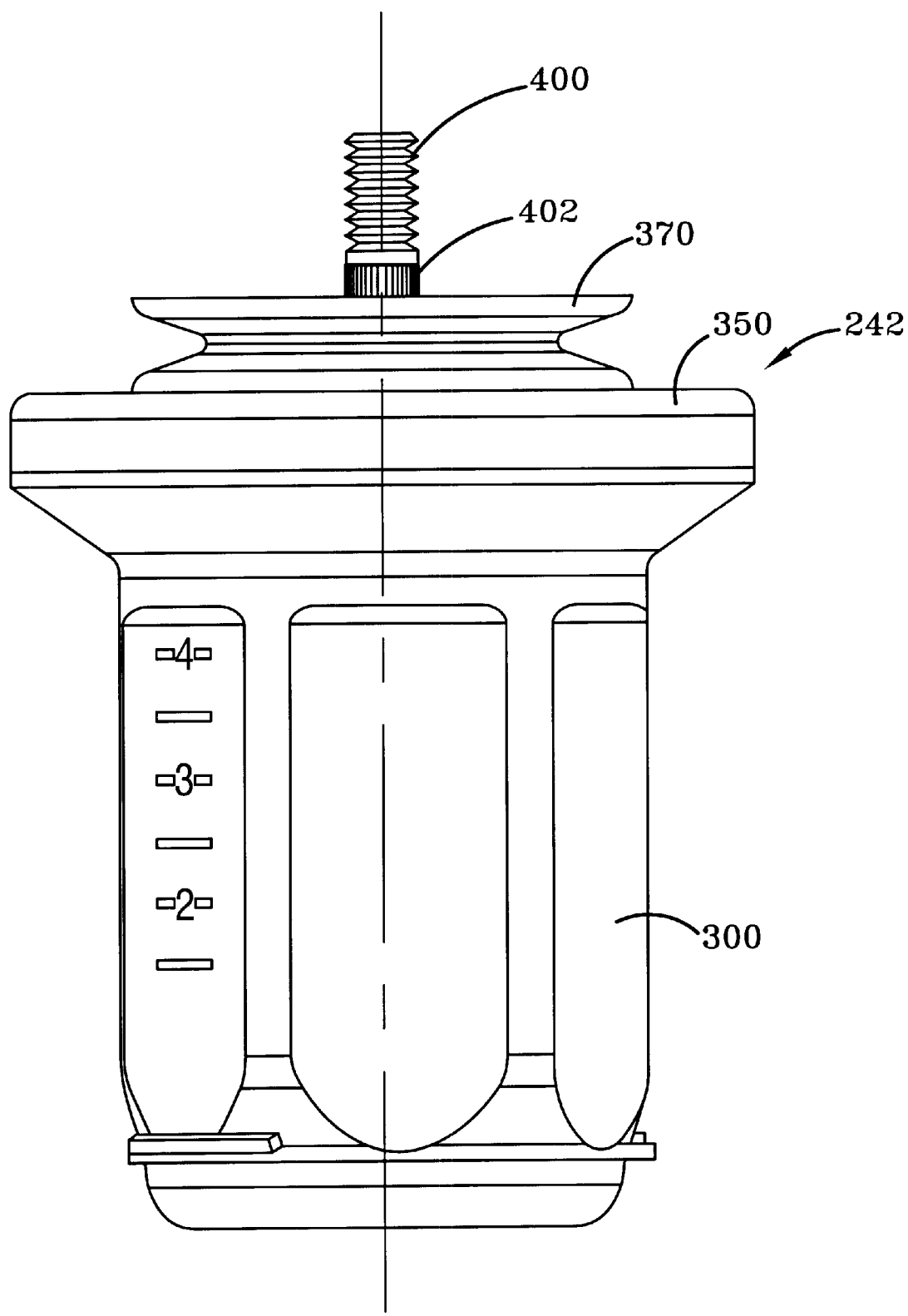
FIG. 2 is an enlarged side elevation view of a spindle assembly of FIG. 1.
Figure 3:
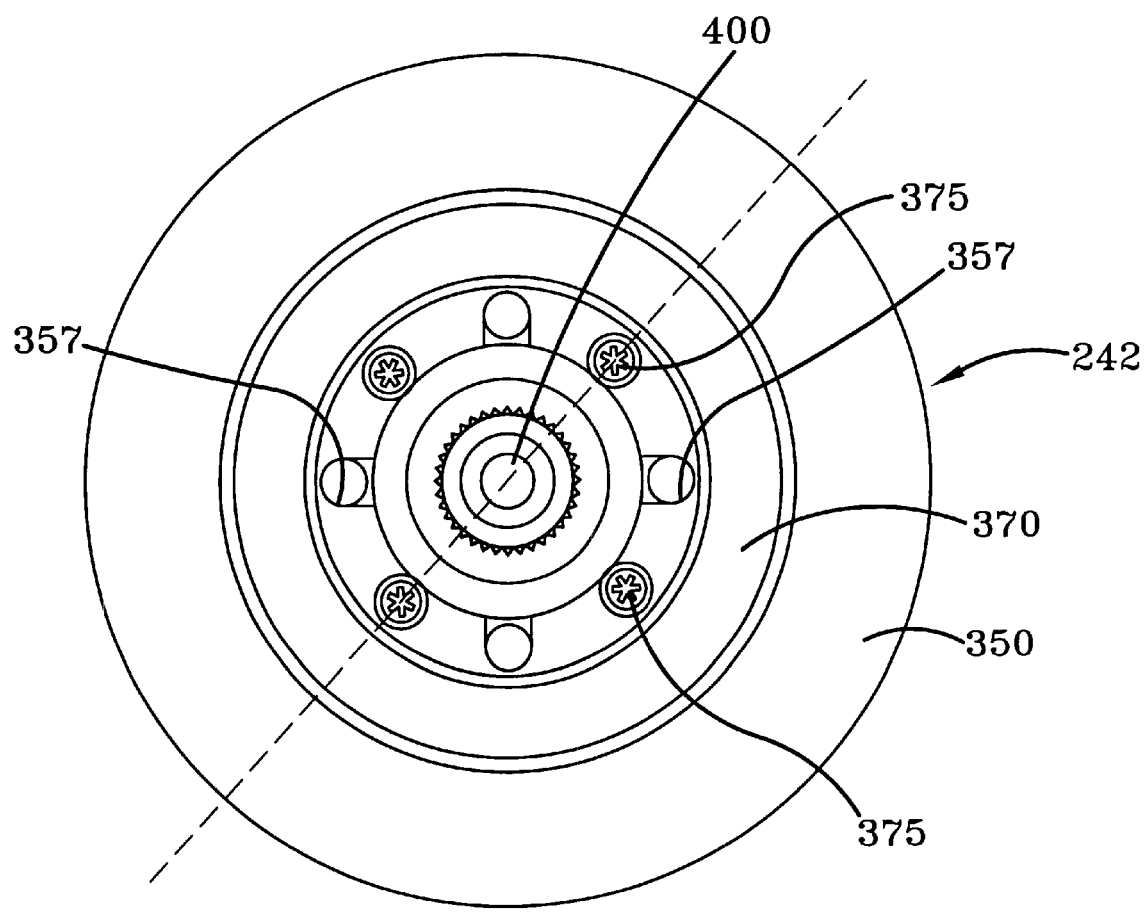
FIG. 3 is a top view of the spindle assembly of FIG. 2.
Figure 4:
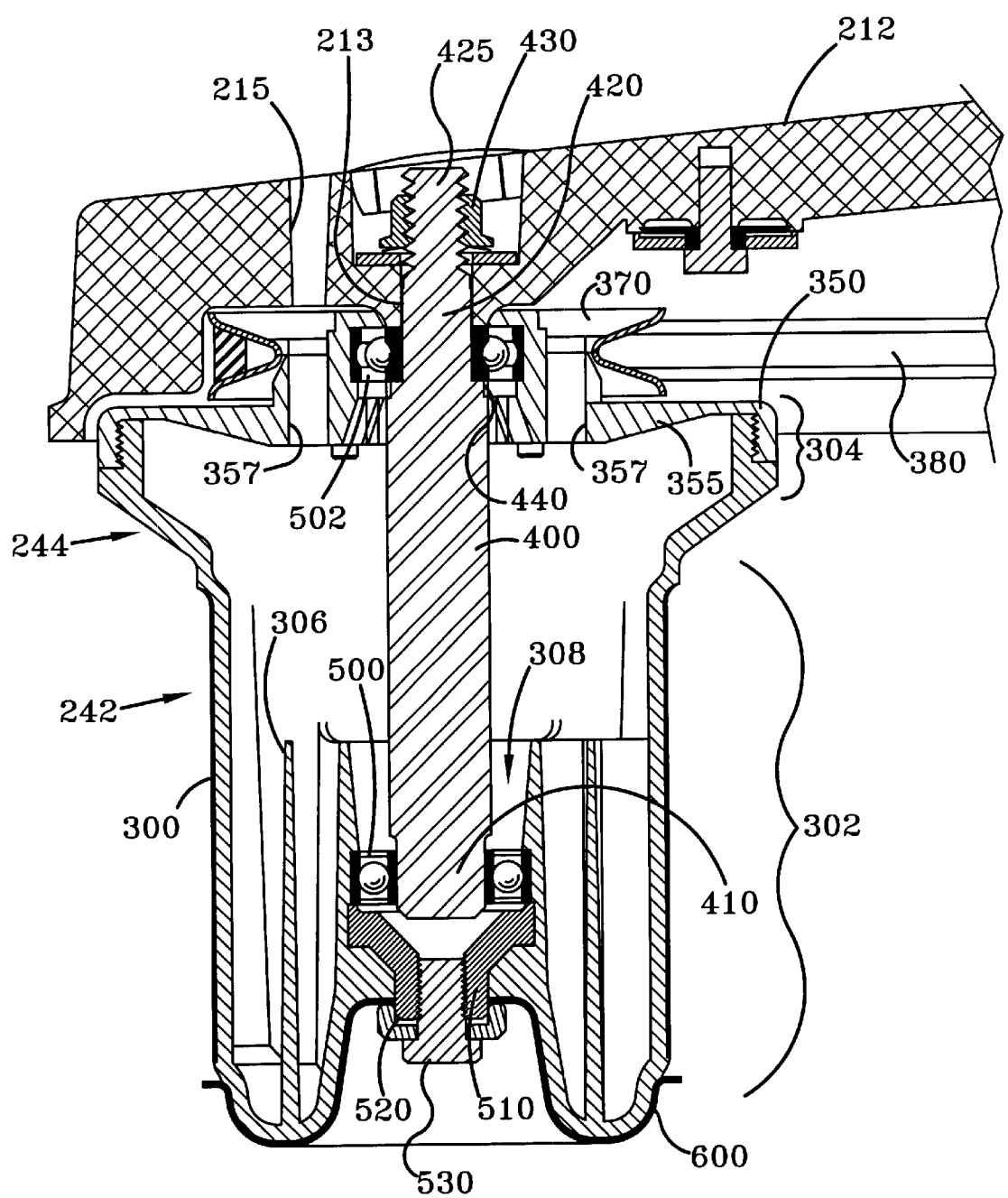
FIG. 4 is a cross-sectional view of the spindle assembly of FIG. 2 attached to a housing of the mowing and trimming apparatus of FIG. 1.

Trimming assembly 218 comprises a trimmer head 240, and a spindle assembly 242 (best shown in FIGS. 2–4). Note that although depicted as hexagonal-shaped, any geometric shaped elongated spindle head and trimmer head center opening could be employed. For example, cylindrical, triangular, rectangular, or polygon shapes could be used.

Trimmer head 240, for example, may comprise a flat, round plastic, die-cast metal, or steel casting, disc approximately one-inch thick and eight-inches in diameter. Trimmer head 240 has a main body with a hexagonal-shaped center opening. The opening is shaped and sized so that trimmer head 240 can encircle and clamp onto a spindle assembly 242. At least one line is attachable to and extends from trimmer head 240. A suitable trimmer head is further described and illustrated in U.S. Pat. No. 5,862,655, the entire subject matter of which is incorporated herein by reference.

A feature of the trimmer head and spindle assembly combination presented herein is the infinite adjustability of the trimmer head relative to the spindle assembly within a range defined by a length of the spindle assembly, and thus an infinite adjustability of the vegetation cut height within a range defined by the length of the spindle assembly. Alternatively, however, the trimmer head could be designed to adjust in graduated movements relative to the elongated spindle assembly. In addition, the spindle assembly can be provided with means for attaching one or more lines at different positions directly onto the spindle assembly, e.g., hooks or cleats which extend from the spindle assembly and to which the lines are attached.

FIGS. 2–4 depict one embodiment of spindle assembly 242 in accordance with the present invention. Spindle assembly 242 generally comprises a cup-shaped spindle head 300, a spindle adapter 350, a pulley 370, and an elongated shaft 400 as described in greater detail below. Such a spindle assembly reduces the complexity, cost of manufacture, and weight, compared to a rotatably supported shaft and spindle head fixedly attached to the rotatable shaft. In addition, the present spindle assembly allows quickly removing and replacing a spindle assembly by readily detaching the shaft from the housing.

As best shown in FIG. 4, spindle assembly 242 includes a spindle unit 244 which encircles and is rotatable about elongated shaft 400 which is fixedly and non-rotatably attachable at an upper end thereof to housing 212 of mower and trimming apparatus 200 (FIG. 1). Pulley 370 is mounted to spindle head 300 and is driven by drive belt 380 and related components of mowing and trimming apparatus 200 (FIG. 1).

Spindle head 300 includes a first portion 302 which is hexagonally shaped and a second portion 304 which is cylindrical shaped. Spindle head 300 includes a transition area where the cross-sectional shape of the structure is tapered from the hexagonal shape to the circular shape. Again, those skilled in the art should recognize that the hexagonal shaped spindle head and the corresponding hexagonal-shaped center opening in the trimmer head are provided herein by way of example only. Various other geometric shapes could be employed for the spindle head and trimmer head center opening.

Spindle adapter 350 includes a disk-shaped portion 355 having an outer portion which comprises internal threads for matingly engaging and releasably attaching to an externally threaded upper portion of spindle head 300. A first bearing 502 is mounted in the center of disk-shaped portion 355. Desirably, an outer race of bearing 502 is attached to spindle adapter 350 during an injection molding process for forming disk shaped portion 355. As shown in FIG. 3, pulley 370 is attached to a top portion of disk-shaped portion 355 by a plurality of bolts or screws 375.

With reference again to FIG. 4, desirably a plurality of reinforcing ribs extends radially from a center opening 308 in spindle head 300 to receive a second bearing 500. Advantageously, an outer race of bearing 500 is attached to spindle head 300 during an injection molding process for forming spindle head 300. A molding insert 510 is desirably used during the injection molding process to provide a barrier to the bearing during the injection molding process. Advantageously, a lower portion of molding insert 510 defines a rectangular-shaped nut 520 which matingly engages a correspondingly rectangular shaped and sized opening in a wear cap 600 to drive wear cap 600 along with spindle head 300. Molding insert 510 also includes a threaded opening extending therethrough for receiving a bolt 530 for attaching wear cap 600 to spindle head 300.

Bearing 500 and 502 are vertically aligned and sized to form a slip fit for receiving shaft 400 therethrough. A lower portion 410 of shaft 400 extends through bearing 500, and an upper portion 420 is sized to extend through bearing 502. An uppermost distal portion 425 of shaft 400 is provided with external threads for releasably attaching to a nut 430. Housing 212 includes an opening sized for receiving uppermost distal end 425 of shaft 400. Desirably, a downwardly-depending shoulder 213 extends from a lower surface of housing 212 around the opening so that shoulder 213 engages a surface of the inner race of bearing 502. Thus, upon tightening nut 430, bearing 502 is clamped between a step or shoulder 440 of shaft 400 and shoulder 213 of housing 212 so that shaft 400 is rigidly and fixedly attached and unable to rotate relative to housing 212. Desirably, shaft 400 includes a knurled or splined portion 402 (FIG. 2) to further inhibit shaft 400 from rotating relative to housing 212. In addition, pulley 370 is spaced-apart from the bottom of housing 212, i.e., provided with a clearance, as described further below.

With reference again to FIG. 4, desirably, the orientation of the threads connecting the spindle adapter to the spindle head is opposite from the direction of the rotation of the spindle assembly. This provides a self-tightening of the spindle adapter to the spindle head when operating the trimming assembly. A throughhole 215 in housing 212 is alignable with one of throughholes 357 in spindle adapter 350. For example, a screw driver is insertable into throughhole 215 and into one of throughholes 357 to prevent rotation of the spindle adapter and the shaft relative to the housing when installing and/or removing the spindle assembly.

In use, pulley 370 and spindle adapter 350 are disposed adjacent to a lower surface of housing 212, while the lowermost distal end of spindle head 300 which includes wear cap 600 is designed to rest on the ground. Spindle assembly 242 protects bearing 500, and particularly bearing 502 by being positioned close to the underside of housing 212 but slightly spaced therefrom to allow the pulley and the spindle adapter to rotate relative to the housing. Spindle adapter 350, and thus spindle head 300 is rotated by being driven by a conventional belt drive 380, which is powered by the engine of the cutting and trimming apparatus as noted above.

Spindle head 300 desirably has a diameter at least equal to three inches and preferably larger, e.g., four inches. Such a large diameter, coupled with tapering from cylindrical portion 304 to hexagonal portion 302 is responsible for significantly eliminating wrapping of cut fibrous material around the trimming assembly when the apparatus is in operation.

With reference again to FIGS. 1 and 2, trimming head 240 (FIG. 1) is adjustably positionable relative to spindle assembly 242. In addition to this wide range of adjustability, e.g., three inches or more, it is significant to note that the adjustability is infinite within the range provided. Thus, within this range an operator can set the cutting plane of the trimmer head to any desired height above ground. Assuming a three inch range of adjustability, then an operator might infinitely select cutting height within a range of approximately 1.5 inches to 4.5 inches as desired depending upon the type of vegetation being cut.

Figure 5:
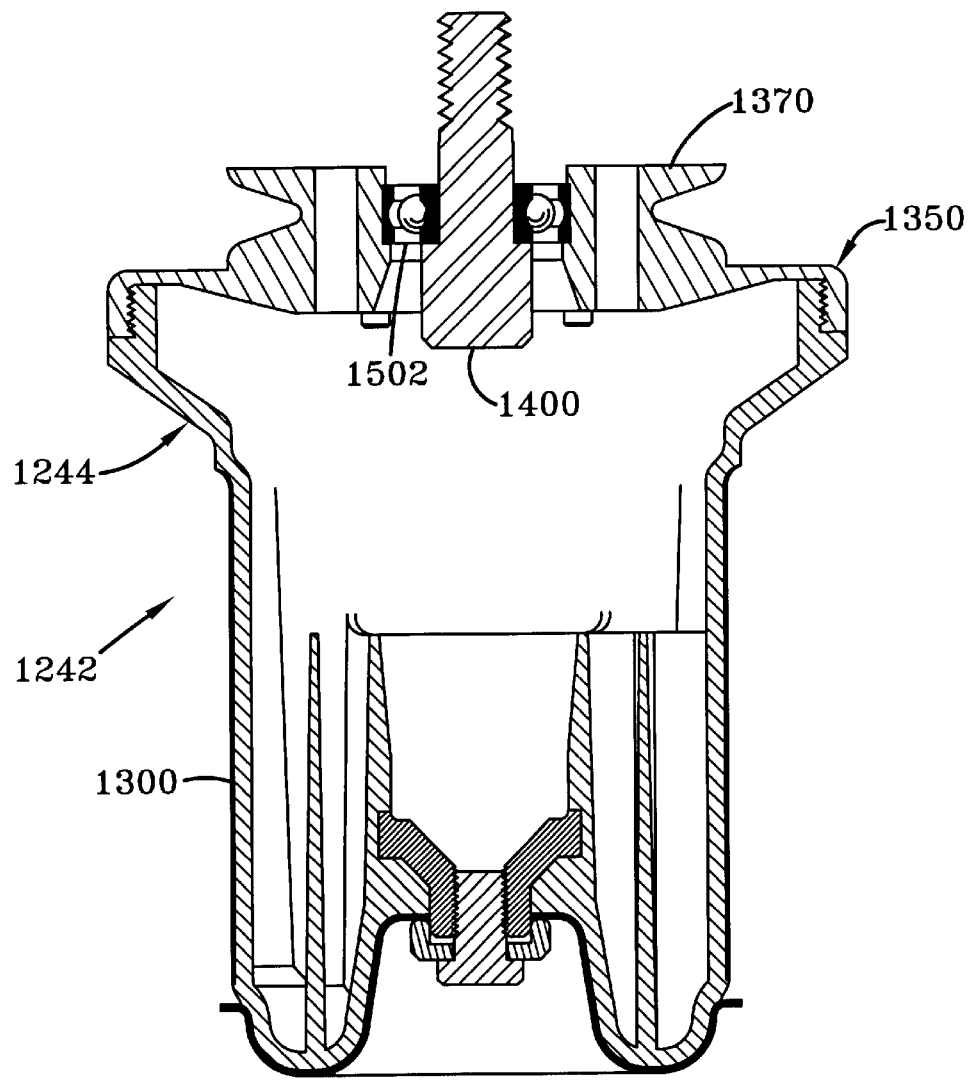
FIG. 5 is a cross-sectional view of another embodiment of a spindle assembly of the present invention.

FIG. 5 is an alternative embodiment of a spindle assembly 1242 according to the present invention. In this embodiment of spindle assembly 1242 includes a shaft 1400 fixedly and non-rotatably attachable to the housing of a mowing and trimming apparatus, and a spindle unit 1244 comprising a spindle head 1300, a spindle adapter 1350, and a pulley 1370. Advantageously, pulley 1370 and spindle adapter 1350 are integrally formed as one-piece. As illustrated in FIG. 5, spindle assembly 1242 include a single bearing 1502 supportable on shaft 1400. Desirably, bearing 1502 is mounted in spindle adapter 1350 during injection molding of the combined pulley and spindle adapter.

Figure 6:
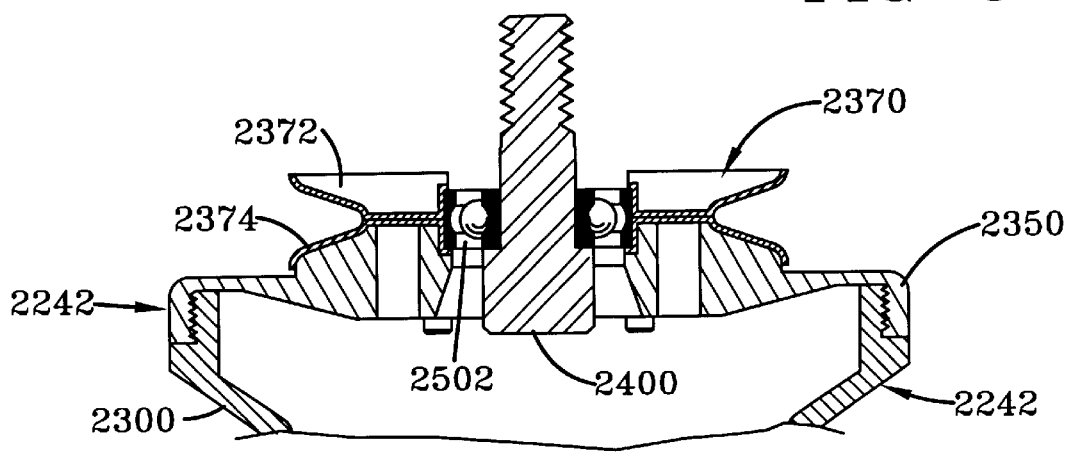
FIG. 6 is a partial cross-sectional view of another embodiment of a spindle assembly of the present invention.

FIG. 6 is a partial illustration of an alternative embodiment a spindle assembly 2242 according to the present invention. In this embodiment, spindle assembly 2242 includes a shaft 2400 fixedly and non-rotatably attachable to the housing of a mowing and trimming apparatus, and a spindle unit 2244 comprising a spindle head 2300, a spindle adapter 2350, and a pulley 2370. Advantageously, pulley 2370 includes an upper pulley half 2372 and a lower pulley half 2374 which are attached to spindle adapter 2350. Between the pulley halves is sandwiched a bearing 2502 supportable on shaft 2400. Desirably, spindle adapter 2350 is molded to matingly conform with the outer lower surface of pulley half 2374.

Desiralby, the spindle adapter and spindle head described above are formed form a plastic such as, for example, nylon, polycarbonate, polyethylene and/or a metal such as, for example, aluminum or steel.

Figure 7:
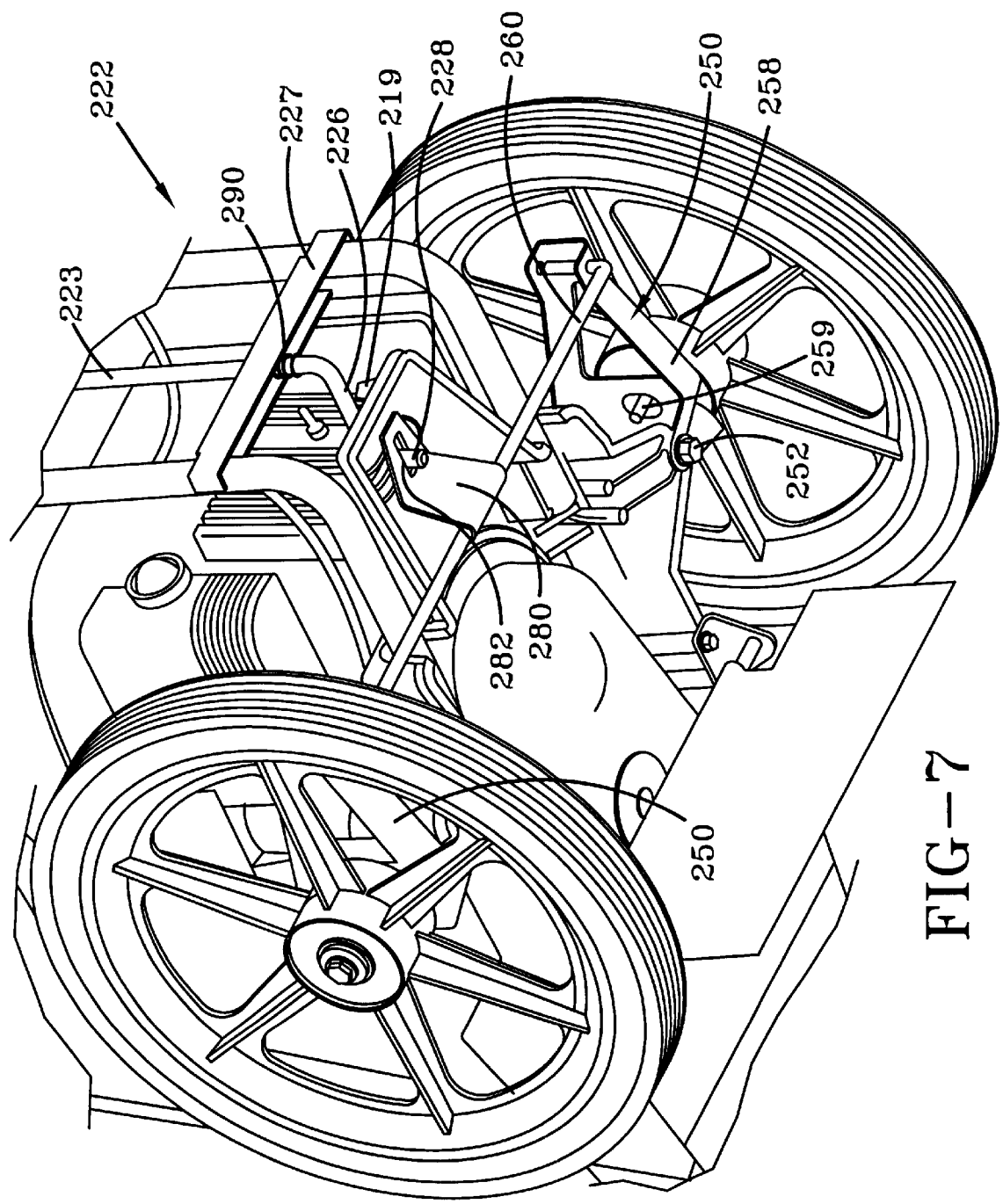
FIG. 7 is an enlarged, bottom perspective view of a portion of the mowing and trimming apparatus of FIG. 1.
Figure 8:
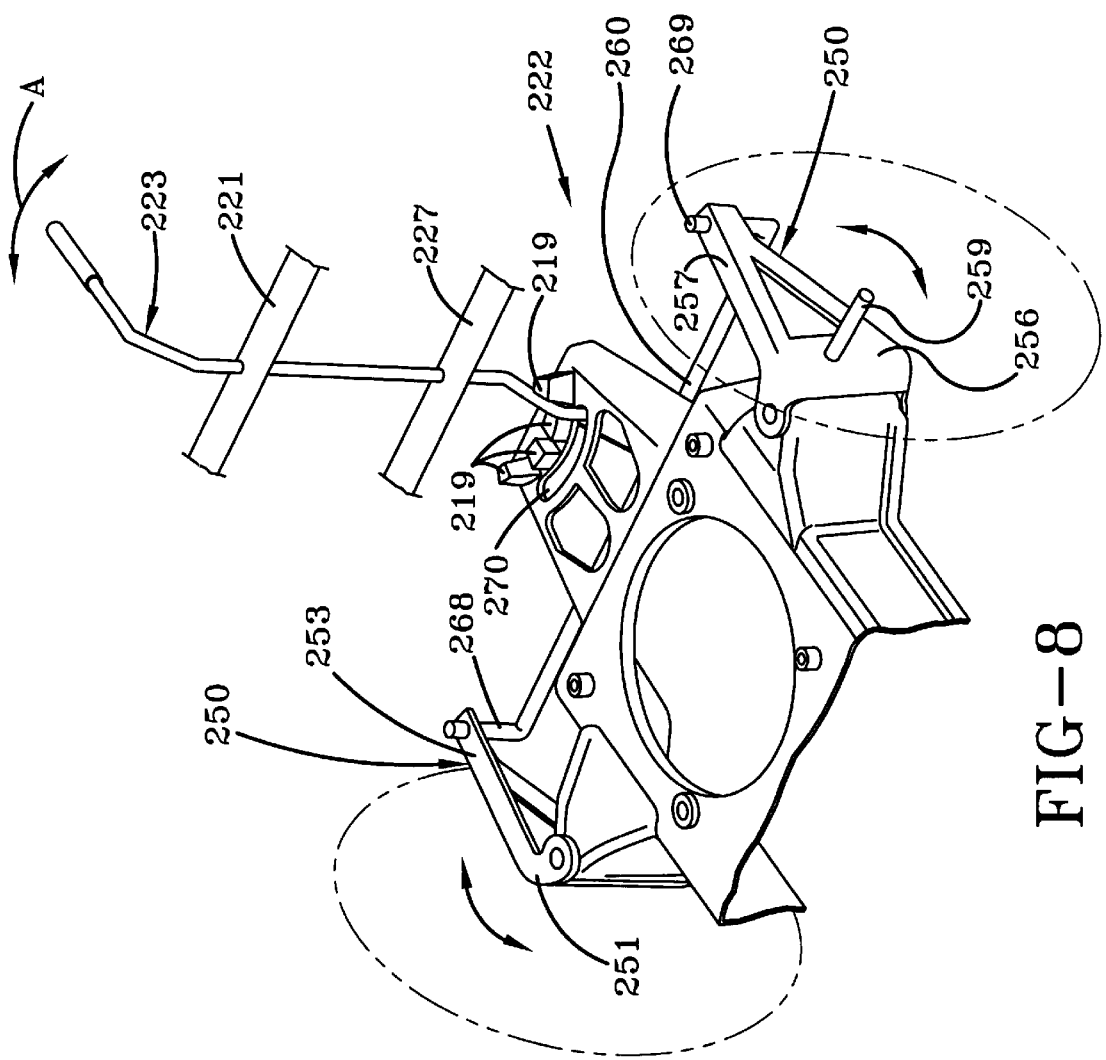
FIG. 8 is a perspective view of the wheel adjust mechanism of the present invention showing rotation of the wheels to a rightward orientation.

FIGS. 7 and 8 depict in greater detail one embodiment of a wheel adjust mechanism 222 in accordance with the present invention. As shown, wheel adjust mechanism 222 includes a movable arm 223, which passes through aligned openings in transverse members 221 and 227 (FIG. 1) of handle assembly 224 (FIG. 1). The openings are sized to allow rotation of movable arm 223. A spring 290 (FIG. 7) is disposed on the underside of the transverse member 227 to apply a downward force on movable arm 223 and thereby retain the position of a lower Z-shaped portion 226 (FIG. 7) of movable arm 223 in one of desirable three positions defined between adjacent ones of four raised cleats 219 (best shown in FIG. 8). The outermost cleats desirable project upwardly higher compared to the innermost cleats to limit the angular rotation of movable arm 223.

A lowermost vertically-extending portion 228 (FIG. 7) of movable arm 223 engages a slot 282 (FIG. 7) in a projecting member 280 (FIG. 7) which is attached to tie rod 260. Desirably, tie rod 260 is a one-piece tie rod and projecting member 280 is welded to a mid portion of tie rod 260.

With reference to FIG. 8, moving movable arm 223, in the directions of double-headed curved arrow A allows easy manual repositioning of vertically-extending portion 228 (FIG. 7) of movable arm 223 along a slot 270 to a desired position through a simple raising and swinging motion applied to movable arm 223.

Tie rod 260 comprises a generally U-shaped configuration which pivotally connects at each end thereof to one of a pair of wheel brackets 250. Attached to each wheel bracket 250 is an outwardly-extending axle 259 for rotatably supporting one of ground engaging wheels 220. Each wheel bracket comprises a generally C-shaped cross-section defining a vertically-extending central portion 256, a pair of spaced-apart horizontally-extending legs 257 and 258 (FIG. 7), a first end 251 and a second end 253.

In this illustrated embodiment of wheel adjust mechanism 222, each of first end portions 251 of brackets 250 comprises a first pair of vertically-aligned spaced-apart holes which extend through upper and lower horizontally-extending legs 257 and 258 (FIG. 7) and through which a pair of bolts 252 (only one of which is shown in FIG. 7) is extendable therethrough and attachable to housing 212 for pivotally attaching brackets 250 to housing 212.

Each of second end portions 253 of brackets 250 comprises a pair of vertically-aligned spaced-apart holes through which are receivable opposite vertically-extending legs 268 and 269 of generally U-shaped tie rod 260. Each bracket 250 can rotate with translation of tie rod 260 attached to a second end 253 of bracket 250 from side to side in response to repositioning of movable arm 223 relative to positioning cleats 219.

With arm 223 disposed in a central position between handle assembly 224 as shown in FIG. 1, housing 212 is generally symmetrically disposed between wheels 220. As shown in FIG. 8, arm 223 is rotated so that the lower portion of the arm 223 is in the rightmost adjustment position, which would cause the trimming assembly to be exposed on the left side of the parallel oriented wheels. Conversely, movement of arm 223 so that the lower portion of arm 223 is disposed in the leftmost position (as viewed from the rear portion of housing 212) results in the trimming assembly being exposed beyond the right wheel of the apparatus. Note that multiple additional adjustment cleats and/or positions could also be provided by housing 212. Advantageously, the handle assembly remains fixedly disposed relative to the housing notwithstanding pivoting of the wheels and thus will be positioned away from the structure around which vegetation is being trimmed once the wheels are manually repositioned parallel to the structure.

Those skilled in the art should note from the above discussion that a mowing and trimming apparatus in accordance with this invention has certain features which improve functionality, performance and durability. These features include a new trimming assembly design of a compact spindle assembly with a rotatable spindle unit supported on a fixed shaft, improved height adjustability of a trimming head, spindle bearing protection, and elimination of grass wrapping about the trimming assembly when the apparatus is operational.

As another advantage, improved exposure of the trimming head beyond the wheels is possible employing the wheel adjust mechanism of the present invention. By simple actuation of the wheel adjust mechanism, the wheels are effectively steered between a left position, center position or right position, thus effectively placing the trimming assembly to either side of the wheels permitting conveniently trimming along buildings, under fences, around trees, etc.

The disclosed wheel adjust mechanism of the present invention provides a compact steering mechanism which reduces manufacturing cost, results in reduced weight, and requires no adjustment for pivoting the wheels relative to the housing. Advantageously, brackets 250 formed by a metal stamping process, tie rod 260 formed by a bending process, projecting member 280 welded to tie rod 260, and cleats 219 molded in housing 212, are readily and inexpensively fabricated. In addition, such a wheel adjust mechanism is readily and inexpensively assembled and repaired.

While the invention has been described in detail herein in accordance with certain preferred embodiments thereof, many modifications and changes therein may be effected by those skilled in the art. For example, the trimming assembly could be fabricated to accommodate a single line segment or three or more line segments. Accordingly, it is intended by the appended claims to cover all such modifications and changes as fall within the true spirit and scope of the invention.

What is claimed is:

1. A wheel adjust mechanism for a mowing and trimming apparatus comprising a housing having front, rear, and opposite side portions, and a pair of ground engaging wheels, said wheel adjust mechanism comprising:

a pair of pivotal brackets each having a first end portion and a second end portion, each of said first end portions of said brackets pivotally attachable to a different one of the opposite side portions of the housing;

a pair of axles, each of said axles attachable to a different one of the pair of brackets and outwardly-extending therefrom for rotatably attaching to the ground engaging wheels;

a tie rod having a first end and a second end, each of said ends attachable to a different one of said second end portions of said brackets; and means for adjustably moving said tie rod relative to the housing to cause the ground engaging wheels attached to said brackets to pivot relative to the housing of the mowing and trimming apparatus.

2. A wheel adjust mechanism of claim 1 wherein said brackets comprise a generally C-shaped cross-section defining a vertically extending central portion and a pair of spaced-apart horizontally-extending legs.

3. A wheel adjust mechanism of claim 2 wherein said brackets are formed by stamping.

4. A wheel adjust mechanism of claim 2 wherein each of said first end portions of said brackets comprises a first pair of vertically aligned spaced-apart holes through which at least one bolt is extendable therethrough and attachable to said housing for pivotally attaching said brackets to said housing.

5. A wheel adjust mechanism of claim 1 wherein said means for adjustably moving said tie rod comprises a projecting member attached to said tie rod, said projecting member having a horizontally-extending portion having an elongated slot.

6. A wheel adjust mechanism of claim 5 further comprising a moveable arm having a lower portion engageable with said slot so that movement of said arm causes said tie rod to translate respectively toward and away from opposite side portions of said housing thereby causing the ground engaging wheels attached to said brackets to pivot relative to the housing of the mowing and trimming apparatus.

7. A wheel adjust mechanism of claim 6 wherein said arm comprises an upper generally horizontally extending portion releasably engageable with a plurality of stops disposed on said housing for fixedly positioning a vertically-extending lower portion of said arm to thereby fix the ground engaging wheels relative to said housing of the mowing and trimming apparatus.

8. A wheel adjust mechanism of claim 1 wherein said tie rod is one piece.

9. A mowing and trimming apparatus comprising:
a housing having front, rear and opposite side portions;
a handle connectable to said rear portion of said housing;
a trimming assembly mountable to said housing at said front portion;
means for rotating said trimming assembly about an axis of rotation;
a pair of ground engaging wheels; and
a wheel adjust mechanism of claim 1 attached to said housing and to said ground engaging wheels for adjusting the position of said ground engaging wheels relative to the housing.

10. The mowing and trimming apparatus of claim 9 wherein said trimming assembly comprises a spindle assembly comprising a shaft fixedly and non-rotatably attachable to said housing, and a spindle unit attachable to said shaft for rotation about said shaft.

11. A wheel adjust mechanism for a mowing and trimming apparatus comprising a housing having front, rear, and opposite side portions, and a pair of ground engaging wheels, said wheel adjust mechanism comprising:
a pair 1of pivotal brackets each having a first end portion and a second end portion, each of said first end portions of said brackets pivotally attachable to a different one of the opposite side portions of the housing;
a pair of axles, each of said axles attachable to a different one of the pair of brackets and outwardly extending therefrom for rotatably attaching to the ground engaging wheels;
a tie rod having a first end and a second end, each of said ends attachable to a different one of said second end portions of said brackets; and
means for adjustably moving said tie rod relative to the housing to cause the ground engaging wheels attached to said brackets to pivot relative to the housing of the mowing and trimming apparatus,
wherein said brackets comprise a generally C-shaped cross-section defining a vertically-extending central portion and a pair of spaced-apart horizontally-extending legs,
wherein each of said first end portions of said brackets comprises a first pair of vertically aligned spaced-apart holes through which at least one bolt is extendable therethrough and attachable to said housing for pivotally attaching said brackets to said housing,
wherein each of said second end portions of said brackets comprises a pair of vertically aligned spaced-apart holes, said tie rod comprising a generally U-shaped configuration having a horizontally extending portion and opposite vertically-extending legs defining said first and second ends, and wherein said each of said vertically-extending legs is extendable through a different one of said pair of spaced-apart holes in said second end portion of said brackets.

12. A mowing and trimming apparatus comprising:
a housing having front, rear and opposite side portions;
a handle connectable to said rear portion of said housing;
a trimming assembly mountable to said housing a said front portion, said trimming assembly comprises a shaft fixedly and non-rotatably attachable to said mowing and trimming apparatus; and a spindle unit attachable to said shaft and drivable by said mowing and trimming apparatus for rotation about said shaft;
means for rotating said trimming assembly about an axis of rotation;
a pair of ground engaging wheels rotatably attached to said rear portion of said housing;
a pair of pivotal brackets each having a first end portion and a second end portion, each of side first end portions of said brackets pivotally attachable to a different one of the opposite side portions of the housing;
a pair of axles, each of said axles attachable to a different one of the pair of brackets and outwardly-extending therefrom for rotatably attaching to the ground engaging wheels;
a tie rod having a first end and a second end, each of said ends attachable to a different one of said second end portions of said brackets; and
means for adjustably moving said tie rod relative to the housing to cause the ground engaging wheels attached to said brackets to pivot relative to the housing of the mowing and trimming apparatus.

* * * * *